US006820198B1

United States Patent
Ross

(10) Patent No.: US 6,820,198 B1
(45) Date of Patent: Nov. 16, 2004

(54) ENCRYPTION VIA USER-EDITABLE MULTI-PAGE FILE

(76) Inventor: Peter William Ross, 10 Hinkler Ct., Morayfield 4506 (AU)

( * ) Notice: Subject to any disclaimer, the term of this patent is extended or adjusted under 35 U.S.C. 154(b) by 0 days.

(21) Appl. No.: 09/529,761

(22) PCT Filed: Jul. 29, 1999

(86) PCT No.: PCT/AU99/00611

§ 371 (c)(1),
(2), (4) Date: Apr. 17, 2000

(87) PCT Pub. No.: WO00/13162

PCT Pub. Date: Mar. 9, 2000

(30) Foreign Application Priority Data

Sep. 1, 1998 (AU) .............................................. PP 5598

(51) Int. Cl.[7] ............................................... G06F 1/24
(52) U.S. Cl. ....................... 713/165; 713/200; 713/201
(58) Field of Search ................................ 713/165, 200, 713/201

(56) References Cited

U.S. PATENT DOCUMENTS 4,870,683 A   9/1989   Atalla
5,623,548 A   4/1997   Akiyama et al.
5,812,668 A * 9/1998   Weber .......................... 705/79
5,862,325 A * 1/1999   Reed et al. .................. 709/201

FOREIGN PATENT DOCUMENTS

WO   WO 93/01578   1/1993

* cited by examiner

Primary Examiner—Thomas R. Peeso

(57) ABSTRACT

A large user-editable data file ("BED" file) allows customizing of an encryption/decryption computer program and strengthens encryption by making the difference between the input character code at a particular target file position and the corresponding output character code very variable and dependant on, importantly, the input character itself and the user-controlled BED file, in addition to the key and particular target file position. A pseudo-random number, ultimately dependant on the key and target file position, selects a specific BED file page and also is added to the input character code, the sum becoming a positional index into that page, and the value at that index yielding the output character code. A graphical user interface allows editing of each BED file page and temporarily lists missing values and highlights illegal duplicates in color. Colored number value sub-sets allow the state of randomness of each page to be easily seen.

4 Claims, 5 Drawing Sheets

ENCRYPTION VIA USER-EDITABLE MULTI-PAGE FILE

This invention is part of an existing unpublished new Computer Program Bakthi Encrypt V 1.00 independently created by the applicant and inventor Peter William ROSS on his own behalf during July 1997 to August 1998.

TECHNICAL FIELD

The technical field of this invention is general purpose Encryption/Decryption Computer Programs.

BACKGROUND ART

The unpublished Computer Program mentioned in the introduction, the best mode for carrying out the invention, contains much which is commonplace in Encryption/Decryption Computer Program art. Such things as the manipulation of ANSI codes for characters, Pseudo-Random Number Generator use, and mathematical translations are commonplace in this art. The novel methods described later in the Disclosure of Invention and Claims, however, are not commonplace and, to the best knowledge of this applicant/inventor, nor are they the prior invention of someone else. These novel methods were thought of by this applicant/inventor completely independently. No Encryption literature was read, and no advice was sought from others during the creation of the above-mentioned unpublished Computer Program. These novel methods are simple, but not obvious. Many good novel ideas are simple, and seem obvious after reading about them, but are by no means obvious beforehand.

DISCLOSURE OF INVENTION

Novel methods applied to a large data file forming part of an Encryption/Decryption Computer Program constitute the invention. These novel methods are:

(1) Allowing users to safely edit the large data file thus enabling enable the creation, by each user, of a uniquely customised version of the original Program, effectively allowing each user to create his or her own unique, private, secret Custom Encryption/Decryption Program.

(2) The use of a continuously changing unpredictable but reproducible number (ultimately derived from a Key) to select a particular "page" of data from the large data file and the subsequent use of one of the random number values on that "page", to further encrypt or decrypt the character currently being manipulated, thus creating a character "rotation" which is variable.

(3) In the context of a graphical user interface displaying "pages" of data from the large data file, the provision of the means whereby the data may be safely edited by the user, especially the method of temporarily allowing duplicate values on a "page" of data at one stage but in the following stage identifying the duplicate values by colouring them and also adding a list of the values missing from the set of number values, both actions facilitating the further editing of the page to make it correct.

(4) In the same context as (3) above, the division of the set of possible number values forming each "page" into sub-sets each displayed in a different colour so that the state of randomness of the values in each "page" can be seen at a glance.

The Computer Program discussed in the Introduction comes complete with two files in Help File format and one file in Text File format. The purpose of these three files is to explain to the future retail licence holder how to use the Computer Program and how the Computer Program works. The best way to disclose the invention and place it in context is to include Excerpts of relevant topics from these three files and drawings of the visible Graphical User Interfaces used in the two electronic forms (Standard Operations Form and Advanced Operations Form) used by the Computer Program. Continual reference to the drawings while reading will greatly aid the understanding of the invention.

Pages 3 to 10 contain an Excerpt from BEHp%%!!.hlp, the main Help File of the Program itself.

Pages 10 to 12 contain an Excerpt from BEInstallUninstall.txt, a Text File for the Program users.

Pages 12 to 23 contain an Excerpt from a Decrypted BEAK%%!!.hlp, the latter forming the Bakthi Analyst Kit, which explains HOW the Computer Program works by describing its Encryption/Decryption algorithms in great detail, including explanations with relevant source code.

Page 1/5 contains illustrations of the Standard Operations Form.

Pages 2/5 to 5/5 are illustrations of the Advanced Operations Form.

Amongst the descriptive Pages 1 to 24, and the drawings, Pages 1/5 to 5/5, the 24 pages that are most relevant to the five Claims (Pages 25, 26) of this Application for a Standard Patent are Pages: 1, 2, 3, 5, 6, 7, 8, 9, 13, 14, 15, 16, 17, 18, 19, 20, 21, 22, 23, 24; 2/5, 3/5, 4/5, 5/5

Note that on Pages 4, 5, 7, 8, 9, 11, 12, 14, 16, 23, 24 the large user-editable file is variously identified as the Bakthi Encrypt Data File, the BED File, the BED File, and MALA%%!!.BED. All these terms refer to the same entity. The BED File is also described as being in either a Factory Default State or a Custom State. Note also that the large user-editable data file and the Encryption Key are distinct entities.

Description Pages 4, 10, 11, 12 are less important, serving mainly to place the invention in context.

EXCERPT FROM BEHp%%!!.hlp

BEGINNER'S GUIDE

Bakthi Encrypt is a 32 bit Windows application designed to Encrypt, Decrypt, or Destroy local files of any type individually one after the other. It is composed of two forms:

The Standard Operations Form becomes visible when the application opens. Encryption which is very probably unbreakable can be achieved using this form alone.

The Advanced Operations Form, accessible only by selecting Bakthi Advanced . . . from the Choices menu of the Standard Operations Form, can be used to create a uniquely customised version of Bakthi Encrypt, in effect creating a private, secret Custom Program.

Encryption which is almost certainly unbreakable can be achieved by making use of both the forms.

(Definition of unbreakable: "Unbreakable encryption, in the practical sense, means cryptanalysts utilising enormous resources, for example, supercomputers with millions of fast parallel processors. and having a full knowledge of the encryption/decryption algorithm, will not be able to discover the plaintext of a practical document from the ciphertext alone, without knowledge of the secret Key. Both the present art and this author consider the well-known Vernam One Time Pad Cipher to be the only theoretically unbreakable cipher.")

Basic manipulation of the Standard Operations Form is described below.

To Encrypt a file quickly: Click Auto Key. Then click Edit Key. Then change some of the digits in the 90 digit panel. It is not compulsory to change some of the digits, but it is wise to do so as it ensures the Key is not entirely computer-generated. Click Accept Key. Then either manually write down the 90 digit Key, or click Print Key to print the 90 digit Key. Click Hide Key if you are worried about prying eyes. Click Select File, then select the file to encrypt. Click Encrypt File, then close the message box. Then click Copy FileName. This should nearly always be clicked because not only does it add the file name to a list destined for the Clipboard, it also enables Edit Key again whilst retaining the 90 digit Key so that the cycle of clicking Command Buttons can be restarted to process another file. Note that if Bakthi Encrypt has written to the Clipboard, then when Bakthi Encrypt is closed the Clipboard will be completely cleared for security reasons.

To Decrypt a file previously encrypted by Bakthi Encrypt: Click Edit Key. Then type the 90 digits of the Key used to encrypt the file. Click Accept Key. Click Hide Key. Click Select File, then select file to decrypt. Click Decrypt File, then close the message box. Then click Copy FileName (see above).

To Destroy a file completely: First press F5. Then click Select File, then use the dialog box to select the file to destroy. Click Destroy File, then close the message box. Click Copy FileName to add the name of the destroyed file to a list destined for the Clipboard (see above) and to re-enable Select File so that the cycle of clicking Buttons can be restarted to destroy another file. To return to encrypt mode, press F5 again.

STANDARD MENUS

Choices Menu

New F2: Makes the Standard Operations Form ready for new work. Resets the 90 digit Key to all zeroes. Does not change toggle selections, so if the Option Destroy File sub-menu or the Ignore Custom Settings sub-menu had a tick beside it, it retains that tick. Empties any pre-existing file list, but does not clear the copy of that file list left on the Clipboard. When Copy FileName is next clicked, both the empty file list and the full Clipboard change to a sole entry reflecting the currently selected file.

Option Destroy File F5 : This is a toggle selection. Press F5 to place a tick beside the sub-menu item and change to destroy mode. Press F5 again to remove the tick and change back to encrypt mode. Presence of a tick indicates destroy mode. Absence of a tick, the default, indicates encrypt mode. Affects the file list and Clipboard in the same manner as New F2.

Warning!!!: A message box warns of the dangerous power of Bakthi Encrypt.

Bakthi Advanced . . . : Shows the Advanced Operations Form, used to create a uniquely customised, private, secret. Custom version of the Bakthi Encrypt Program.

.BED File Status . . . : Current status—Factory Default. Custom, Not Found.

Ignore Custom Settings: Toggle selection. Select it to place a tick beside it and ignore a Custom .BED File (if any) by using an internal Original Data Source. Select it again to remove the tick and utilise a Custom. BED File (if any). Presence of a tick indicates .BED File custom settings (if any) are being ignored. Absence of a tick, the default, indicates .BED File custom settings (if any) are in effect. With a Factory Default .BED File, tick or no tick the program uses identical data. See Working Principles and Care of .BED File for .BED File information.

Exit F8: Closes the entire application and clears the Clipboard if written to.

ADVANCED OPERATIONS FORM

This form, accessible only by selecting Bakthi Advanced . . . from the Choices menu of the Standard Operations Form, can be used to create a uniquely customised version of Bakthi Encrypt, in effect creating a private, secret Custom Program. Encryption which is almost certainly unbreakable can be achieved by making use of both the forms.

This form exists solely to manipulate the Bakthi Encrypt Data File MALA%%!!.BED, henceforth referred to as the .BED File, a 75,735 byte file containing 25,245 three digit numbers arranged in 99 pages of 255 numbers each.

Placed permanently within the Bakthi Encrypt executable itself by the programmer is an Original Data Source comprising 25,245 numbers arranged in 99 pages. The order of the numbers on each page of this data source was determined by manually drawing, without replacement, 255 marbles numbered 1 to 255 from a barrel. For all 99 pages this took 60 man-hours, but the result is a truly random number order. Bakthi Encrypt V 1.00 ships with a Factory Default .BED File which is an exact copy of, and additional to, this Original Data Source. If the user has changed the .BED File and wishes to recreate the Factory Default .BED File, Factory 99 plus Save All 99 plus YES will create a new .BED File by copying the internal Original Data Source.

A private, secret Custom Program is created by writing a unique Custom .BED File.

Using the Advanced Operations Form it is possible to:
(1) View a .BED File one page at a time (Color will color various number ranges).
(2) Manually change numbers on one or several pages and store the results in RAM.
(3) Generate quite random numbers for a single page using Auto Values.
(4) Generate quite random numbers for all 99 pages using Auto 99.
(5) Edit the numbers generated in (3) or (4) to make them even more random.
(6) Do (1), (2), (3), (4), or (5) without affecting the old .BED File at all.
(7) Do (2), (3), (4), or (5) then change the .BED File with Save All 99 and YES.

For details of the large Command Buttons on the right side and bottom of this form, see Advanced Commands (Right) and Advanced Commands (Bottom) respectively.

For some information on the use Bakthi Encrypt V 1.00 makes of the .BED File for Encryption/Decryption purposes see Working Principles.

ADVANCED COMMANDS (RIGHT)

Show: Unhides the current page of 255 numbers.

Hide: Hides the current page of 255 numbers behind asterisks.

Select Page: Enables the Page Selector (Edit Box+ associated UpDown arrows) on the upper right side of the application window. A particular page may be selected either by directly editing the page number in the Edit Box or clicking one of the UpDown arrows to increment or decrement the page number one page at a time.

Lock Page: Disables the Page Selector (Edit Box+ associated UpDown arrows), and stores the currently selected page number in volatile memory (RAM).

Edit Values: Positions the Insertion Point at the first digit of the first number. Enables all 255 numbers on the current page, allowing them to be edited. The program allows only entries in the range 001 to 255 for each of the 255 numbers. Duplicate values, which are illegal, are allowed at this stage, but will later be identified by Store Values for correction by further editing.

Auto Values: Optional ease of use feature. Automatically generates a set of 255 almost completely unpredictable numbers for the current page. Clicking Select Page, then Lock Page, then Edit Values will allow some numbers to be further edited. It is not compulsory to change some of the numbers, but it is wise to do so as it ensures the page of 255 numbers is not entirely computer-generated.

Store Values: First checks the current page of 255 numbers for duplicate values. If there are no duplicate values, stores the current page of 255 numbers in volatile memory (RAM). These numbers are inactive until saved by clicking Save All 99 then choosing Yes in answer to the Destruction of Old Settings Imminent Dialog Box. If there are duplicate values, identifies them with a yellow background color. and also creates at the bottom of the window a large yellow panel listing the missing numbers, then enables Edit Values again so that it can be clicked to allow the duplicate values to be corrected by further editing.

Save All 99: The Destruction of Old Settings Imminent Dialog Box appears. A NO answer to this Dialog Box just sets the enabled/disabled properties of all Command Buttons on the Advanced Operations Form back to their initial default states. See Advanced Commands (Bottom) to find out the results of a YES answer.

ADVANCED COMMANDS (BOTTOM)

Warning!!!: Warns of potential loss of file contents and also mentions the importance of Save All 99.

Auto 99: Optional ease of use feature. Automatically generates 99 sets of 255 almost totally unpredictable numbers for all 99 pages at once and stores them all in volatile memory (RAM). These numbers are inactive until saved by clicking Save All 99 then choosing Yes in answer to the Destruction of Old Settings Imminent Dialog Box. For each page, Click Select Page, use the Page Selector to select the page, click Lock Page, click Edit Values, edit some of the numbers, then click Store Values. It is not mandatory to change some numbers on each page in this manner, but it is wise to do so as it ensures each page of 255 numbers is not entirely computer-generated.

Factory 99: Changes every one of the 255 numbers on every page of the 99 pages to its factory default value then stores all of them in volatile memory (RAM). Bakthi Encrypt achieves this by copying data which the programmer placed permanently within the executable file itself. These numbers are inactive until saved by clicking Save All 99 then choosing Yes in answer to the Destruction of Old Settings Imminent Dialog Box.

Color: Depending on its value, each of the 255 numbers on the current page has its background color set according to the following color scheme:

| VALUE: | 001–009 | 010–085 | 086–123 | 124–132 | 133–170 | 171–246 | 247–255 |
|---|---|---|---|---|---|---|---|
| COLOR: | Aqua | Blue | Green | Lime | Green | Purple | Red |

This allows the level of randomness of the numbers to be seen at a glance.

White: Click Color, and the caption changes to White. Click White, and 255 edit box backgrounds on the current page become white, and caption White becomes Color.

Save All 99: The Destruction of Old Settings Imminent Dialog Box appears. If the answer to this Dialog Box is YES, the old MALA%%!!.BED file is Destroyed, and a new MALA%%!!.BED file created by copying to the hard disk the 25,245 values (99 pages, each of 255 numbers) just previously stored in volatile memory (RAM). Standard Operations then immediately reads the new MALA%%!!.BED file, allowing these 25,245 values, some or all of them new, to take effect without delay. All 25,245 values may be viewed by clicking Show then clicking Select Page then using the Page Selector to view each page in turn. If the answer to the Dialog Box is NO, then the old MALA%%!!.BED file is preserved and remains in effect. Clicking Save All 99 then answering NO to the Dialog Box is a handy, if slightly risky, way of setting the enabled/disabled state of every Command Button on the Advanced Operations Form back to its initial default state.

CARE OF KEY..BED

Care of Key

The Key is the most important aspect of Bakthi Encrypt V 1.00 security. All 90 digits of the Key are made use of. If a particular Key is used to Encrypt a file it will be impossible to Decrypt that file without access to that particular Key.

The Key must be kept SAFE, SECRET, and SECURE.

The Key probably should be changed periodically, for example, fortnightly.

Upon creation of a new Key it should be immediately printed or written down. Electronic archiving of the Key might represent an unacceptable security risk.

Care of .BED File

The Bakthi Encrypt V 1.00 application in its default state cannot Encrypt or Decrypt target files unless it finds the MALA%%!!.BED file, so it is very important that this file and the executable file BakthiEncrypt.exe be kept in the same directory folder. Even for a Factory Default MALA%%!!.BED file this rule applies.

DO NOT Manually Edit the MALA%%!!.BED file. Always use Bakthi Encrypt's Advanced Operations Form when Editing the MALA%%!!.BED file to create a particular unique Custom MALA%%!!.BED file.

If a particular Key and a particular unique Custom MALA%%!!.BED file are used to Encrypt a file it will be impossible to Decrypt that file without access to both that particular Key and that particular Custom MALA%%!!.BED file.

Each Custom MALA%%!!.BED file should be kept SAFE, SECRET, and SECURE.

A Factory Default MALA%%!!.BED should be kept SAFE and SECURE, but need not be kept Secret, being public. Use Factory 99 plus Save All 99 to recreate it.

Changing Custom MALA%%!!.BED files more frequently than annually is NOT wise. A particular Custom MALA%%!!.BED file should be changed after a security breach.

Electronic archiving of Custom MALA%%!!.BED files is a practical necessity.

WORKING PRINCIPLES

General: The BAKTHI ANALYST KIT gives precise details of the encryption algorithm used by Bakthi Encrypt V 1.00. Professional and amateur cryptanalysts can gain access to this optional extra by paying an additional fee 1½ times that of the cost of Bakthi Encrypt V 1.00 itself. Bakthi Encrypt encrypts characters in large blocks. Block size, revealed precisely in the Bakthi Analyst Kit, is between 10,000 and 100,000 characters. Bakthi Encrypt uses the single byte ANSI code for a character. ANSI codes range from 0 to 255. Examples: digit 0=48; digit 9=57; letter A=65; letter Z=90; letter a=97: letter z=122. Bakthi Encrypt views ANSI codes thus: 0 to 255, then 0 again, then on to 255 again. Let c1 c2 c3 c4 represent the ANSI codes for the first four characters of a file.

Key: The user-defined 90 digit Key is the most important item. All 90 digits are made use of. The Key used to encrypt a file must be kept secret. It must not be lost, because it will be needed to decrypt the file. Portions of the Key are used to generate a long series of unpredictable numbers, each within the range 1 to 99, for each character position in the file. Let k1 k2 k3 k4 be the numbers generated for the first four positions in the file.

Data Sources: Bakthi Encrypt V 1.00 has two data sources: the .BED File, and an internal Original Data Source written into the program itself. The Factory Default .BED file shipped with Bakthi Encrypt is identical to the internal Original Data Source. Provided Ignore Custom Settings is not ticked (the default; see Standard Menus), the .BED File is the Data Source, otherwise the internal Original Data Source is used.

.BED File: The Advanced Operations Form can create a Custom .BED File.

Encrypt: Let t1 t2 t3 t4 be temporary ANSI codes, calculated thus: t1=c1+k1 t2=c2+k2 t3=c3+k3 t4=c4+k4 Let b1 b2 b3 b4 be the ANSI codes at list positions t1 t2 t3 t4 on pages k1 k2 k3 k4 of the .BED File Data Source. The first 4 plaintext characters (those with ANSI codes c1 c2 c3 c4) become the encrypted characters corresponding to ANSI codes b1 b2 b3 b4. Whole process is repeated ten-fold with new k1 etc. Final character depends on Key, BED file Data Source, test file position, initial character.

Decrypt: Reverse of Encrypt. Same k1 k2 k3 k4 generated. t1 t2 t3 t4 found by searching pages k1 k2 k3 k4 for b1 b2 b3 b4. c1=t1−k1 c2=t2−k2 c3=t3−k3 c4=t4−k4 Whole process repeated ten-fold in reverse order with same new k1 etc.

Dropped/Inserted Byte Error: Causes the rest of the encrypted file to become garbage. Bakthi Encrypt partly protects itself from this error by encrypting a copy, not the original. and then destroying the original only if file sizes remain the same.

Destroy: Overwrites 17–25 times, the exact number of times being unpredictable. Uses a combination of 01010101, 10101010, random, 00000000 bit patterns.

EXCERPT FROM FILE BEInstallUninstall.txt

| BAKTHI ENCRYPT V 1.00 FILE LIST: | | |
|---|---|---|
| | | BYTES |
| BakthiEncrypt.exe | | 570,368 |
| BEInstallUninstall.txt | | 22,375 |
| BEHp%%!!.hlp | | 33,700 |
| BESetup.exe | | 286,208 |
| MALA%%!!.BED | | 75,735 |
| BEAK%%!!.hlp | (Encrypted) | 30,296 |
| BEHID%%!.txt | (Encrypted) | 16,000 |

BAKTHI ENCRYPT V 1.00 GENERAL INFORMATION

Bakthi Encrypt V 1.00 is a 32-bit program which requires Windows 95 or Windows 98 or Windows NT V 4.0, or later, operating systems to run.

This program Encrypts, Decrypts, or Destroys files.

Providing they reside on a local hard disk, or local floppy disk, accessible for write operations, Bakthi Encrypt V 1.00 is able to Encrypt, Decrypt, or Destroy files of any type. It can manipulate video, graphic, sound, compressed, uncompressed, executable, database, spreadsheet, document, text, and all other file types, in any format.

ADVICE FOR NEW USERS

An encrypted file of the .txt type can be viewed normally (as gobbledegook), but encrypted files of most other types will not even load in the file viewer or file player until Decrypted.

An encrypted file can be copied, moved, or distributed on networks, intranets, and internets just like a normal file, regardless of its type or format.

GENERAL SECURITY

Attacks on Encryption systems can include efforts to furtively alter them or corrupt them as well as efforts to break them and learn the contents of secret files. All seven Bakthi Encrypt V 1.00 files. and their legal copies, should be kept SAFE and SECURE, both physically and electronically.

IGNORE CUSTOM SETTINGS AND BE INDEPENDENT OF THE .BED FILE

Ignore Custom Settings (Choices Menu, Standard Form) is a toggle selection.

If this toggle is in its default unticked state Bakthi Encrypt will use the current .BED file. whether Custom or Factory Default, as its data source.

If this toggle is in a ticked state Bakthi Encrypt will use an internal Original Data Source written into the main executable as its data source. It is then possible to Encrypt and Decrypt target files without reading the .BED File. Even if MALA%%!!.BED is deleted it still remains possible to Encrypt and Decrypt target files when Ignore Custom Settings is ticked.

The disadvantages of having Ignore Custom Settings in a ticked state are:

(a) It is not the default state. Each time Bakthi Encrypt is opened Ignore Custom Settings has to be put in a ticked state by clicking it.

(b) A Custom .BED File is not being used and thus the full power of the program is not being used. However, even without a Custom .BED File, Bakthi Encrypt V 1.00 is still very powerful. It uses a 90 DIGIT Key, equating to 10 raised to the power of 90 possible keys. Compare this very strong encryption strength with some others: A 40 BIT Key equates to 10 raised to the power of 12.04 possible keys. A 128 BIT Key equates to 10 raised to the power of 38.53 possible keys.

(c) Since the Factory Default MALA%%!!.BED File is not used in this case some users may choose to delete it. If they do, each time they open Bakthi Encrypt V 1.00 they will suffer the minor nuisance of having three error messages inform them that it is missing. If they then forget to tick Ignore Custom Settings and attempt to Encrypt or Decrypt a target file, a fourth error message will appear and stop proceedings. This will remind them to tick Ignore Custom Settings (albeit indirectly) and once this is done attempts to Encrypt or Decrypt files will succeed and the fourth error message will not show.

NOTE FOR CRYPTANALYSTS

The file BEAK%%!!.hlp is distributed in Encrypted form on the Bakthi Encrypt distribution disk. Decryption of this file using Bakthi Encrypt will yield the Bakthi Analyst Kit, which provides information in Help file format. The Bakthi Analyst Kit contains complete and truthful details of the Encryption and Decryption algorithms employed by Bakthi Encrypt V 1.00. The 90 digit Key allowing BEAK%%!!.hlp to be Decrypted using Bakthi Encrypt V 1.00 in a Factory Default state may be purchased at a cost 1.5 times the price of Bakthi Encrypt V 1.00 itself. Purchase of the Key also entitles the purchaser to take part in the Bakthi Encrypt Cryptanalyst Competition. Only one person can win this competition, which has a substantial prize. The competition uses the file BEHID%%!.txt, distributed in Encrypted form on the Bakthi Encrypt distribution disk. This is a file, originally of ordinary English text, which has been Encrypted using both a secret Key and a secret Custom BED File. To win the competition, a Bakthi Analyst Kit purchaser has to become the first person to do both the following:

(a) Decrypt BEHID%%!.txt using cryptanalysis alone, without any knowledge of the secret Key or the secret Custom BED File or the original English text.

(b) Explain, in a manner which is easily understood and completely acceptable, exactly how Bakthi Encrypt was broken and BEHID%%!.txt uncovered using cryptanalysis.

EXCERPT FROM BAKTHI ANALYST KIT BEAK%%!!.hlp

COMMENTS & CHANGES TO EXCERPT

Comments: This kit uses braces and italics for program comments: {comment}.

Changes to Excerpt: Bakthi Encrypt V 1.00 users who want full and honest details of the program's Encryption and Decryption algorithms can obtain them by purchasing a licence for the Bakthi Analyst Kit V 1.00 at a price 1½ times the value of the Bakthi Encrypt V 1.00 licence itself. If the full details of Bakthi Encrypt V 1.00's Encryption/Decryption algorithms were published in this Description there would be less incentive for people to purchase a Bakthi Analyst Kit V 1.00 licence. For this reason, some details provided in the complete Bakthi Analyst Kit are not provided in this Excerpt created for Patent Application purposes. Patent Claims do not depend on the omitted details. The omitted details are:

(a) True Block Size. The 50000 bytes appearing in this Excerpt is NOT the true Block Size.

(b) A Full Description of the Random Number Generator BERandom.

Full and honest details of items (a) and (b) above are revealed in the COMPLETE Bakthi Analyst Kit.

PIONEERING IDEAS IN BAKTHI ENCRYPT

First Idea: The use of a continuously changing unpredictable but reproducible number (ultimately derived from a Key) to select a particular "page" of data from a data file where each "page" of data consists of 255 positions containing 255 distinct number values (each within the range 001 to 255) arranged in their positions in a random order. each "page" having a different random ordering of its number values, and the subsequent use of one of these random number values to further encrypt the character currently being manipulated.

Second Idea: To make available to the users of the encryption application a special facility which enables them to safely edit the data file described in the previous paragraph. Each user could then have a different unique custom version of the data file. Each user's version of the encryption application could then be a uniquely customised version of the original, publicly distributed. standard encryption application. In effect, every user could have their own unique, private, secret Custom Encryption Program even though they initially received identical copies of the original standard encryption program.

KEY (90 DIGITS)

In the Standard Operations Form of Bakthi Encrypt, the 90 digit central panel allows the secret encryption/decryption key to be edited. Note that this central panel looks like, and functions as, a list of ten 9 digit numbers. Although all 90 digits of the Key are made use of, they are not used as a continuous single 90 digit number but are used as ten separate 9 digit numbers.

The ten 9 digit numbers are initially stored as strings in a ten element string array. For the purposes of this Kit, the Pascal-style array declaration is as follows:

var {form-level variable} keytxt: array[1..10] of string;

In the central panel, keytxt[1] is the 9 character numeric string at the top of the panel. while keytxt[10] is the 9 character numeric string at the bottom of the panel.

Encryption Algorithm and Decryption Algorithm explain how the keytxt array is made use of.

DATA SOURCES

Within Bakthi Encrypt V 1.00 there are three alternative potential data sources:

(1) Internal Original Data Source written into the executable program itself.

(2) BED File in a Factory Default state.

(3) BED File in a Custom state (i.e. the user has edited the BED File).

Which of these sources is in use at any given time depends on the choices the user has made:

The "Ignore Custom Settings" menu selection on the Choices Menu of the Standard Operations Form is a toggle selection:

TICK placed beside it: Program uses the Internal Original Data Source.

NO TICK placed beside it: Program uses the BED File as the data source.

If the BED File has not been edited by a user it will be in a Factory Default state, i.e. the same state it was in when it was shipped as part of the Application. Note that the Factory Default BED File was designed to be, in effective content, identical to, and additional to, the Internal Original Data Source.

On the Advanced Operations Form, Clicking "Factory 99" then "Save All 99" then replying "YES" will result in the program recreating the Factory Default BED File by overwriting the BED File with a "copy" of the Internal Original Data Source. This enables a Custom BED File to be converted back to a Factory Default BED File.

If the BED File has been edited by a user then it is likely to be in a Custom state.

"BED File Status" on the Choices Menu of the Standard Operations Form is read-only and simply informs the user of the current status of the BED File i.e. whether it is a Factory Default BED File or a Custom BED File or Not Found.

Data Source Manipulation explains how data from the current data source is used.

INTERNAL ORIGINAL DATA SOURCE

The effective content of the Internal Original Data Source can be thought of as 25,245 three digit numbers arranged in 99 pages of 255 numbers each. The order of the numbers on each page of this data source was determined by manually drawing. without replacement, 255 marbles numbered 1 to 255 from a barrel. For all 99 pages this took 60 man-hours, but the result is a truly random number order.

The permanent internal representation of the Internal Original Data Source within the Bakthi Encrypt executable is actually a one-dimensional array of strings declared, initialized, and filled in a manner similar to the following:

to as a Custom BED File. Making use of a Custom BED File is, in effect, just like using a private, secret Custom Program.

Data Sources describes some other aspects of user manipulation of the BED File. Data Source Manipulation explains how the current data source is utilised.

Although the Advanced Operations Form does not permit the user to create an illegally formatted Custom BED File, there is always the possibility that the BED File might get changed by some other means, e.g. someone might maliciously or ignorantly choose to edit the BED File directly, or the file might get corrupted. For this reason, when Bakthi Encrypt first loads, it thoroughly investigates the BED File to ensure it conforms to the format expected of a BED File. If the BED file is illegally formatted a message box informs the user of the nature of the format violation and also states that once the message box is closed Bakthi Encrypt will replace the bad BED File with a new Factory Default BED File.

DATA SOURCE MANIPULATION

The three types of Bakthi Encrypt data sources (see Data Sources) are all manipulated in much the same manner. String manipulation functions and a string to integer conversion function (all built-in) are applied to the data source and then the data source is assigned element by element to the two-dimensional array of integers named "book" (see declaration on the next page).

The Encryption Algorithm utilises the book array.

In that algorithm a continuously changing unpredictable but reproducible number (ultimately derived from a Key), in the range 1 to 99, selects a particular "page" and an ANSI value corresponding to the current character (already not an original character, having being "rotated" by the amount

```
{ ****************************************************** }
var                                 { globally available to both major units of the program }
    iods: array[1 . . . 99] of string;  { Internal Original Data Source thus name iods }
implementation
for x := 1 to 99 do                 { x is a local integer variable }
    iods[x] := '';                  { initialize each element as an empty string }
iods[1] := iods[1] + '182 . . . 026';   { string concatenation: } -
iods[1] := iods[1] + '154 . . . 205';   { the string on each line contains - }
iods[1] := iods[1] + '012 . . . 112';   { 51 three digit numbers, so the - }
iods[1] := iods[1] + '181 . . . 064';   { total for the five lines is 255 numbers - }
iods[1] := iods[1] + '225 . . . 131';   { or 765 characters }
String elements iods[2] to iods[99] are then filled in a similar manner.
Each string element has a different random ordering of its 255 three digit numbers.
{ ****************************************************** }
```

Data Source Manipulation explains how the current data source is utilised.

BED FILE

The Bakthi Encrypt Data File MALA%%!!.BED, henceforth referred to as the BED File, is a 75,735 byte file in which every character is a digit. This file should be looked on as effectively containing 25,245 three digit numbers arranged in 99 pages of 255 numbers each. Within each page the numbers all fall within the range 001 to 255, are distinct from each other, and should be randomly ordered.

When it is first shipped, the BED File contains effective content identical to the Internal Original Data Source. While in this state, the BED File is referred to as a Factory Default BED File.

The sole purpose of Bakthi Encrypt's Advanced Operations Form is to allow the user to safely edit the BED File. After it has been edited by a user, the BED File is referred "page") selects the "posn" within the page. The book array element book[page, posn] ends up being accessed by its two indexes, a rapid process. Variable "luck" maps directly to book[page, posn].

Decryption, the reverse of encryption, requires "posn" to be selected via "page" and "luck". This means that book [page, posn] now has to be accessed using only one of its indexes, "page", plus the value of book[page, posn], "luck". For example, if "page" was 33, then on average it would be necessary to search 128 elements in range book[33, 1] to book[33, 255] to find the value "luck".

Searching is unacceptably slow, so Bakthi Encrypt runs the procedure "ace", shown below, when the program first loads or whenever the data source changes.

```
{ **************************************************** }
var
book: array[1 ... 99, 1 ... 255] of Integer;     { globally available to both major units }
easy: array[1 ... 99, 1 ... 255] of Integer;     { available to Standard Operations Form }
procedure ace;                                    { uses local integer variables page, posn, luck }
begin
for page := 1 to 99 do                            { outer loop }
    for posn := 1 to 255 do                       { middle loop }
        for luck := 1 to 255 do                   { inner loop (executes quickest) }
            if book[page, posn] = luck then
                begin
                easy[page, luck] := posn;
                Break;                            { leave the inner loop immediately }
                end;
end;
{ **************************************************** }
```

The Decryption Algorithm then utilises the easy array. The two indexes "page" and "luck" can rapidly access easy[page, luck], which maps directly to "posn".

ENCRYPTION ALGORITHM

```
{ Mix calls Tenmud calls Mud calls Random Number Generator BERandom. }
var                                      { all available to Standard Operations Form }
LocalF: file;                            { Pascal untyped file variable }
targetfile: string;                      { name (including full path) of local file to be encrypted }
Buf: array[1 ... 50000] of Char;         { files encrypted in blocks of 50000 characters }
NumRead, NumWritten, earlyspot, latespot, circ, mink, page, orig, posn, luck: Integer;
beseed: double;                          { in the range 0 <= beseed < 1 }
keytxt: array [1 ... 10] of string;      { ten 9-digit strings from Key (90 Digits) }
{ **************************************************** }
procedure Mix;          BEGIN            { Top-Level Procedure }
AssignFile(LocalF, targetfile);
Reset(LocalF, 1);                        { record size of one byte i.e. one character }
repeat
    earlyspot := FilePos(LocalF);
    BlockRead(LocalF, Buf, SizeOf(Buf), NumRead);
    latespot := FilePos(LocalF);
    Seek(LocalF, earlyspot);             { move the file pointer back to earlyspot }
    TenMud;                              { a middle-level procedure defined below }
    Block Write(LocalF, Buf, NumRead, NumWritten);
until (NumRead = 0) or (NumWritten <> NumRead);
CloseFile(LocalF);      END;
{ **************************************************** }
procedure Tenmud;       BEGIN            { Middle-Level Procedure }
for x := 1 to 10 do                      { x is a local Integer variable }
begin                                    { use Key (90 Digits) to set new initial value of beseed; then call Mud }
    beseed := StrToFloat('0.' + keytxt[x]);  { e.g. '805879426' becomes 0.805879426 }
    Mud;                                 { a low-level procedure defined on the next page }
end;                    END;
{ **************************************************** }
procedure Mud; BEGIN                     { Low-Level Procedure }
for circ := 1 to (latespot - earlyspot) do       { blocks of 50000 characters or less }
    begin
        repeat                           { See Random Number Generator for definition of BERandom }
            mink := (BERandom(999999999)) + 1;   { generate 9-digit "random" integer }
            page := mink mod 100;        { e.g. 576235849 mod 100 is 49 }
        until page <> 0;                 { i.e. if page = 0, generate another number for page }
        orig := Ord( Buf[circ] )         { convert an original character into an integer }
        posn := orig + page;             { "rotate" the character by amount page }
        if posn > 255 then posn := (posn - 256);    { circular series 0 to 255 to 0 to 255 }
        if posn <> 0 then luck := book[page, posn] else luck := 0;  { 0 not translated }
        Buf[circ] := Chr(luck);          { store the final encrypted character }
    end;                END;     { book defined in Data Source Manipulation }
{ **************************************************** }
```

DECRYPTION ALGORITHM

```
{ Demix calls Tendemud calls Demud calls Random Number Generator BERandom }
var                                      { all available to Standard Operations Form }
LocalF: file;                            { Pascal untyped file variable }
targetfile: string;        { name (including full path) of local encrypted file to be decrypted }
Buf: array[1 ... 50000] of Char;         { files decrypted in blocks of 50000 characters }
NumRead, NumWritten, earlyspot, latespot, circ, mink, page, orig, posn, luck: Integer;
```

-continued

```
beseed: double;            { in the range 0 <= beseed < 1 }
keytxt: array [1 ... 10] of string;     { ten 9-digit strings from Key (90 Digits) }
{ ************************************************************** }
procedure Demix;           BEGIN     { Top-Level Procedure }
AssignFile(LocalF, targetfile);
Reset(LocalF, 1);                    { record size of one byte i.e. one character }
repeat
    earlyspot := FilePos(LocalF);
    BlockRead(LocalF, Buf, SizeOf(Buf), NumRead);
    latespot := FilePos(LocalF);
    Seek(LocalF, earlyspot);         { move the file pointer back to earlyspot }
    Tendemud;                        { a middle-level procedure defined below }
    Block Write(LocalF, Buf, NumRead, NumWritten);
until (NumRead = 0) or (NumWritten <> NumRead);
CloseFile(LocalF);         END;
{ ************************************************************** }
procedure Tendemud;        BEGIN          { Middle-Level Procedure }
for x := 10 downto 1 do              { opposite to Tenmud's 1 to 10 } { x: local Integer var }
begin              { use Key (90 Digits) to set new initial value of beseed; then call Demud }
beseed := StrToFloat('0.' + keytxt[x]);    { e.g. '369786522' becomes 0.369786522 }
    Demud;                           { a low-level procedure defined below }
end;                       END;
{ ************************************************************** }
procedure Demud;   BEGIN                   { Low-Level Procedure }
for circ := 1 to (latespot – earlyspot) do     { blocks of 50000 characters or less }
    begin
        repeat       { See Random Number Generator for definition of BERandom }
            mink := (BERandom(999999999)) + 1;  { generate 9-digit "random" integer }
            page := mink mod 100;              { e.g. 435629871 mod 100 is 71 }
        until page <> 0;          { i.e. if page = 0, generate another number for page }
        luck := Ord( Buf[circ] )  { convert an encrypted character into an integer }
        if luck <> 0 then posn := easy[page, luck] else posn := 0;    { 0 not translated }
        orig := posn – page;      { "back-rotate" the character by amount page }
        if orig < 0 then orig := (orig + 256);    { circular series 0 to 255 to 0 to 255 }
        Buf[circ] := Chr(orig);              { store the final decrypted character }
    end;           END;    { easy defined in Data Source Manipulation }
                  RANDOM NUMBER GENERATOR Encryption Algorithm Mud and Decryption Algorithm Demud both call
the pseudo-random number generator BERandom defined below :-
{ ************************************************************** }
var                       { available to Standard Operations Form }
beseed; double;           { in the range 0 < = beseed < 1 }
{ Tenmud actions the two instructions "set initial value of beseed", "call Mud" ten times, each
time using, to set the initial value of beseed, a distinct 9-digit line from the central panel Key. }
{ Tendemud actions the two instructions "set initial value of beseed", "call Demud" ten times,
each time using, to set the initial value of beseed, the same distinct 9-digit lines from the central panel
Key as Tenmud, but in reverse order. }
{ Identical Keys must be used by Tenmud (encryption) and Tendemud (decryption) }
function BERandom(BELimit: Integer): Integer;
begin
    •             { DETAILS OF BERandom OMITTED FROM
    •                  EXCERPT TO MAINTAIN CONFIDENTIALITY }
end;
{ BERandom is a general purpose Random Number Generator. It accepts an
  Integer range limit as an argument, manipulates a global double precision
  real variable beseed, and returns a pseudo-random Integer. }
{ ************************************************************** }
```

OVERVIEW

Previous topic "WORKING PRINCIPLES" described Bakthi Encrypt's Encryption in general terms. The following visualisation might help the reader understand Encryption etc.: Think of the ANSI codes 0 to 255 as a big analogue clock with only one hand. Imagine 255 at the 12 o'clock position, 000 following clockwise, 063 at 3 o'clock, 127 at 6 o'clock, and 191 at 9 o'clock.

Imagine we have two separate files to Encrypt and we want to use the same Key. Suppose file 1 contains "abca" and file 2 contains "defd". In ANSI code terms, file 1 contains 097 098 099 097 and file 2 contains 100 101 102 100.

Imagine also that the use of the first 9 digit line of the Key to initially "beseed" the pseudo-random number generator causes it to generate 17 12 08 20 for the first four file positions in each of the files. Bakthi Encrypt initially adds these to the ANSI values of the characters in each of the files. So file 1 is now 114 110 107 117 and file 2 is now 117 113 110 120.

If this was all that Bakthi Encrypt did cryptanalysts might be able to break it because, for a particular Key and a particular file position, the "rotation" is constant and independent of the character at the file position.

We want a variable "rotation", not a constant "rotation". So the next step is to somehow use the generated 17 12 08 20 to create an additional variable "rotation" that depends on both the Key and the character currently at the file position.

Why not regard 17 12 08 20 as pages of a 99 page book, with each page containing codes 001 to 255 (luck) in random order? If "book" is Factory Default, the following translations would then take place:

| File 1 (using book) | File 2 (using book) |
| --- | --- |
| posn 114 on page 17 to luck 134 | posn 117 on page 17 to luck 141 |
| posn 110 on page 12 to luck 099 | posn 113 on page 12 to luck 038 |
| posn 107 on page 08 to luck 119 | posn 110 on page 08 to luck 107 |
| posn 117 on page 20 to luck 209 | posn 120 on page 20 to luck 211 |

All Bakthi Encrypt Encryption processes are repeated ten-fold with a different series of double digit numbers being generated from each of the ten 9 digit lines in the 90 digit Key. Now Bakthi Encrypt looks like it is probably unbreakable.

Why allow translations be public knowledge? Translations can be private if each user edits "book" (Custom BED File). Bakthi Encrypt now looks truly unbreakable.

Decryption uses Key lines in reverse order, from 10 to 1 rather than 1 to 10. Decryption also uses an algorithm which is the reverse of the Encryption algorithm:

| File 1 (using easy) | File 2 (using easy) |
| --- | --- |
| luck 134 on page 17 to posn 114 | luck 141 on page 17 to posn 117 |
| luck 099 on page 12 to posn 110 | luck 038 on page 12 to posn 113 |
| luck 119 on page 08 to posn 107 | luck 107 on page 08 to posn 110 |
| luck 209 on page 20 to posn 117 | luck 211 on page 20 to posn 120 |

BEST MODE FOR CARRYING OUT THE INVENTION

Figure 1:
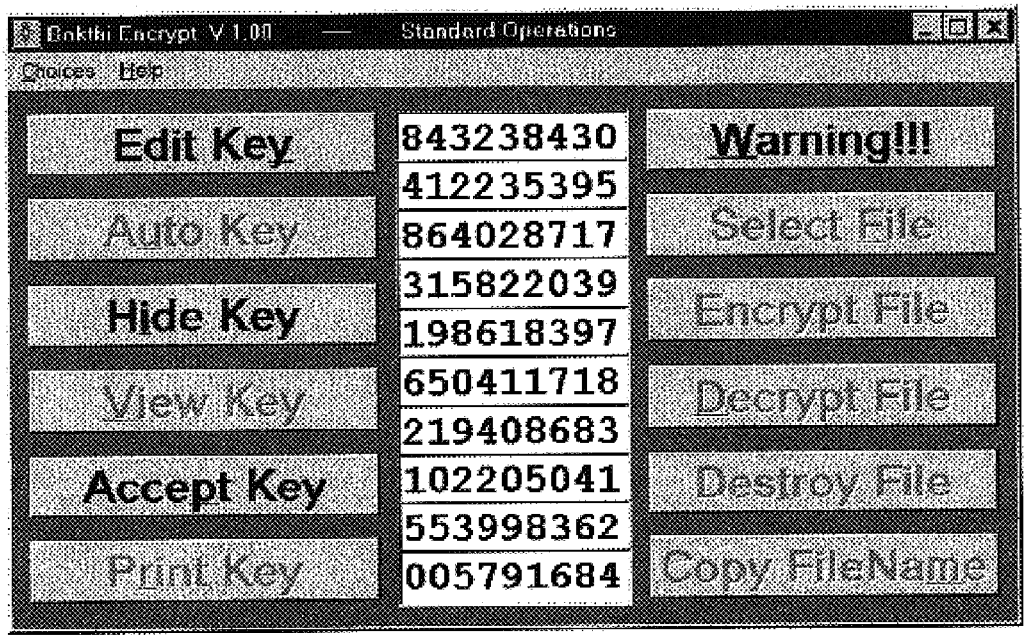
FIG. 1 (Page 1/5) shows the Standard Operations Form of Encryption/Decryption Computer Program Bakthi Encrypt V 1.00. In this drawing a particular 90 digit Key appears in the centre panel.
Figure 2:
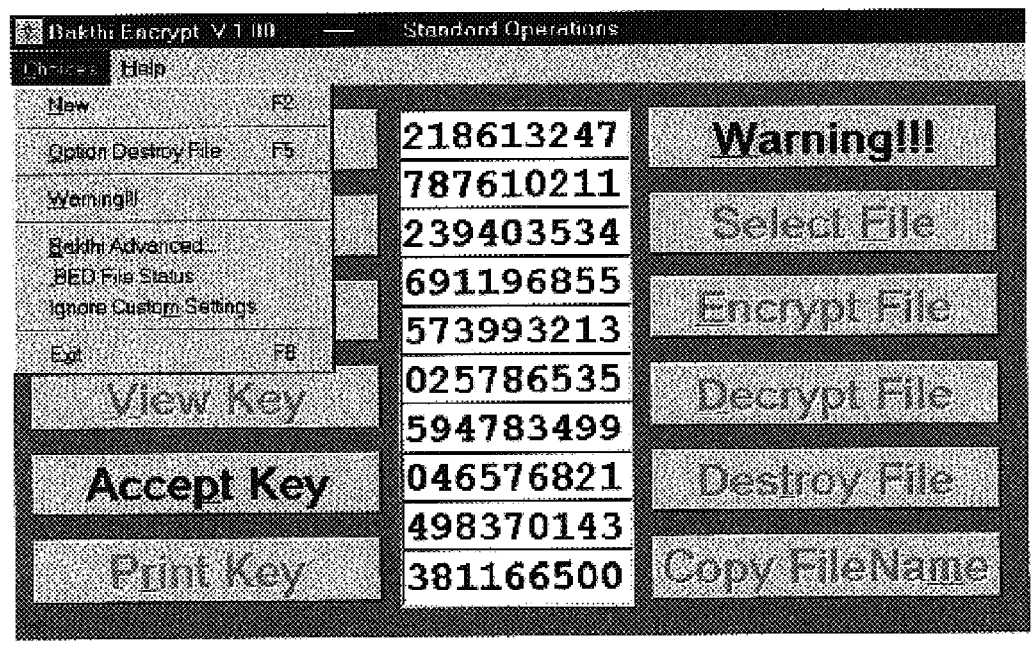
FIG. 2 (Page 1/5) is another view of the Standard Operations Form of FIG. 1. In this view a different 90 digit Key is shown and more importantly, the Choices Menu is Open. The Choices Menu is important because it contains sub-menu Bakthi Advanced, the means by which the user navigates to the Advanced Operations Form which is more relevant to this Application for a Standard Patent. Other relevant sub-menus of the Choices Menu are: .BED File Status, a read-only indication of the status of the large user-editable data file, which can be in a Factory Default or Custom state, or Not Found at all. Ignore Custom Settings, which, if ticked, cause the Customisations the user has applied to the large user-editable data file to create a Custom BED File to be ignored and an internal Original Data Source to be used as the data source instead of the Custom BED File.
Figure 3:
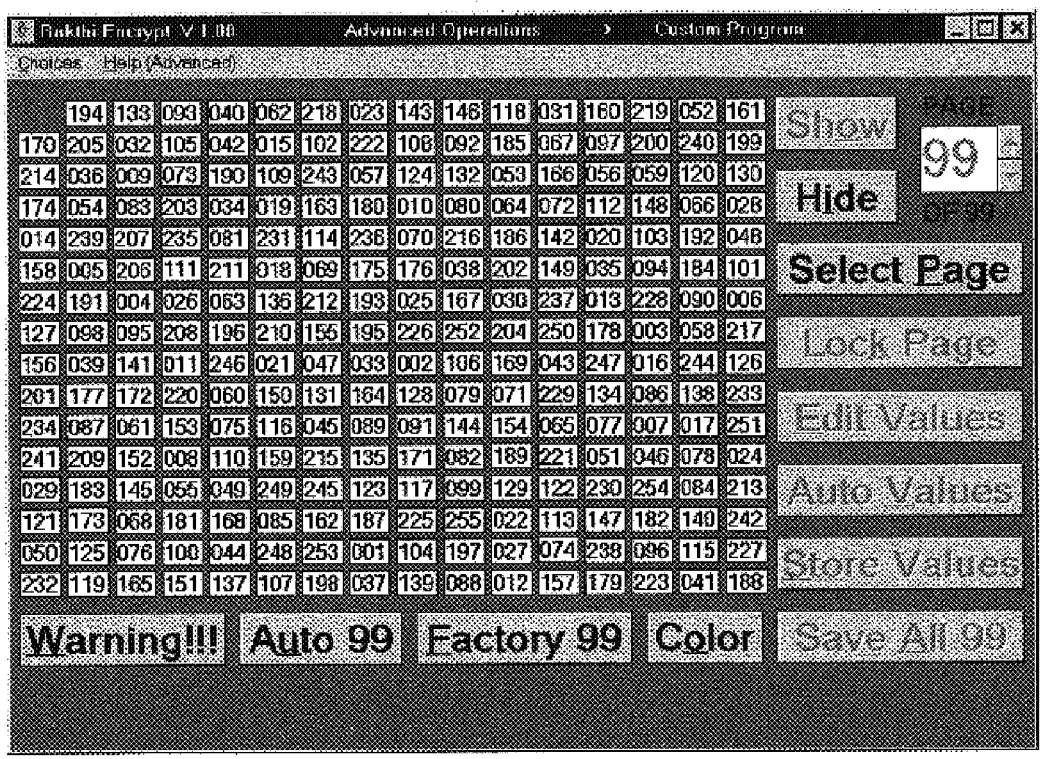
FIG. 3 (Page 2/5) shows the Advanced Operations Form of the Encryption/Decryption Computer Program Bakthi Encrypt V 1.00. In this drawing the Advanced Operations Form is showing "page" 99 of the Factory Default BED File in black and white format.
Figure 4:
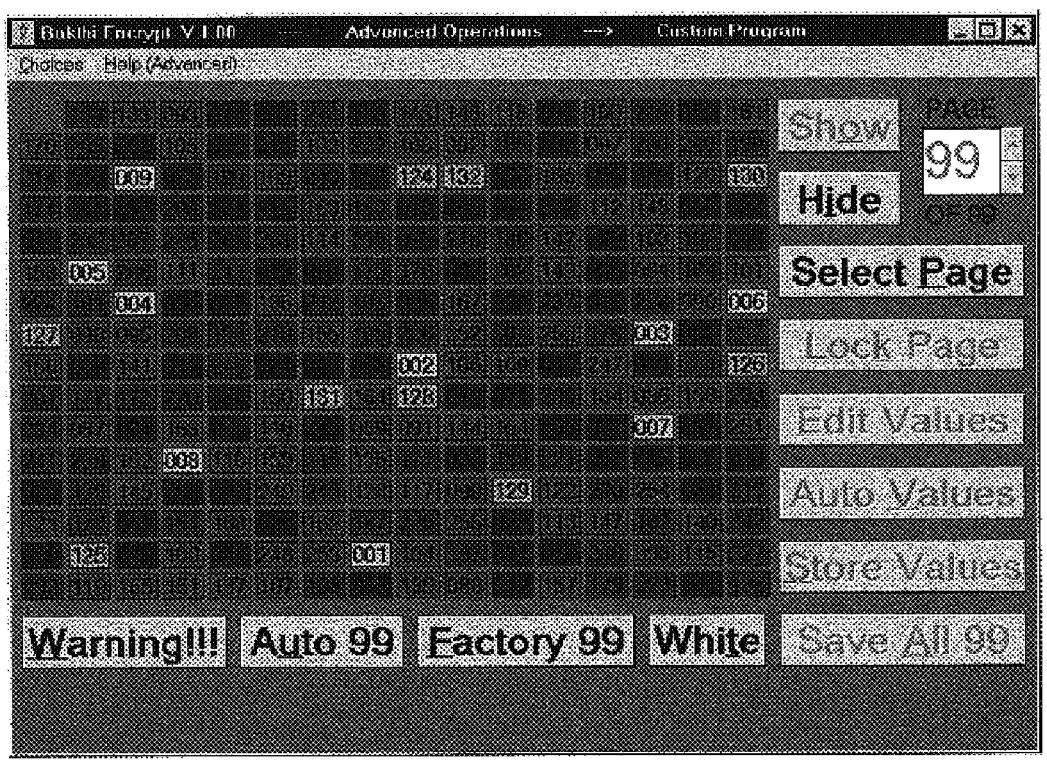
FIG. 4 (Page 315) is another view of the Advanced Operations Form of FIG. 3 In this drawing the Advanced Operations Form is showing "page" 99 of the Factory Default BED File in coloured format. Coloured drawings being banned in Patent applications, the reader will only have a greyscale indication of the utility of this use of colour. Coloured drawings demonstrate the utility of the method better. The colour scheme used by the Encryption/Decryption Computer Program Bakthi Encrypt V 1.00 is listed on Page 7 under the topic heading Color. What is important about this colour scheme is not the particular colours chosen but the method of showing sub-sets of the set of number values in different colours so that the state of randomness of the number values can be seen at a glance. The subject of Claim (4), this method is directly relevant to this Application for a Standard Patent.
Figure 5:
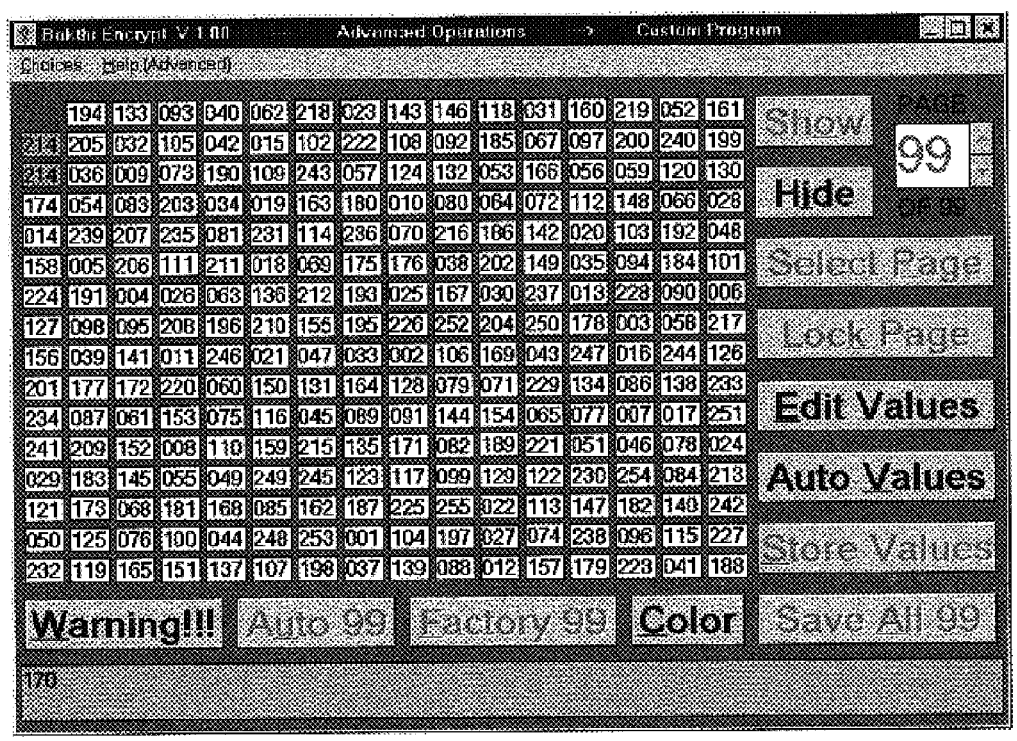
FIG. 5 (Page 4/5) is another view of the Advanced Operations Form of FIG. 3. In this drawing the Advanced Operations Form is showing "page" 99 in the process of being edited by the user. The user has edited the value 170 at the top left of the "page" and incorrectly replaced it with 214, which duplicates another number value (the one immediately below it) on the "page". This duplication is an illegal operation, so when the user applies the next step of clicking Store Values, the Program highlights the duplicates in a different colour (yellow) and lists the values missing from the set of number values in a long coloured bar which is added at the bottom of the Advanced Operations Form. The Program also enables Edit Values again so that the user can correct the mistake. The coloured bar at the bottom is long so that many missing number values can be accommodated in the horizontal list if the user accidentally creates a lot of duplicates. The method of this paragraph is directly relevant to this Application for a Standard Patent because it forms part of the subject of Claim (3).
Figure 6:
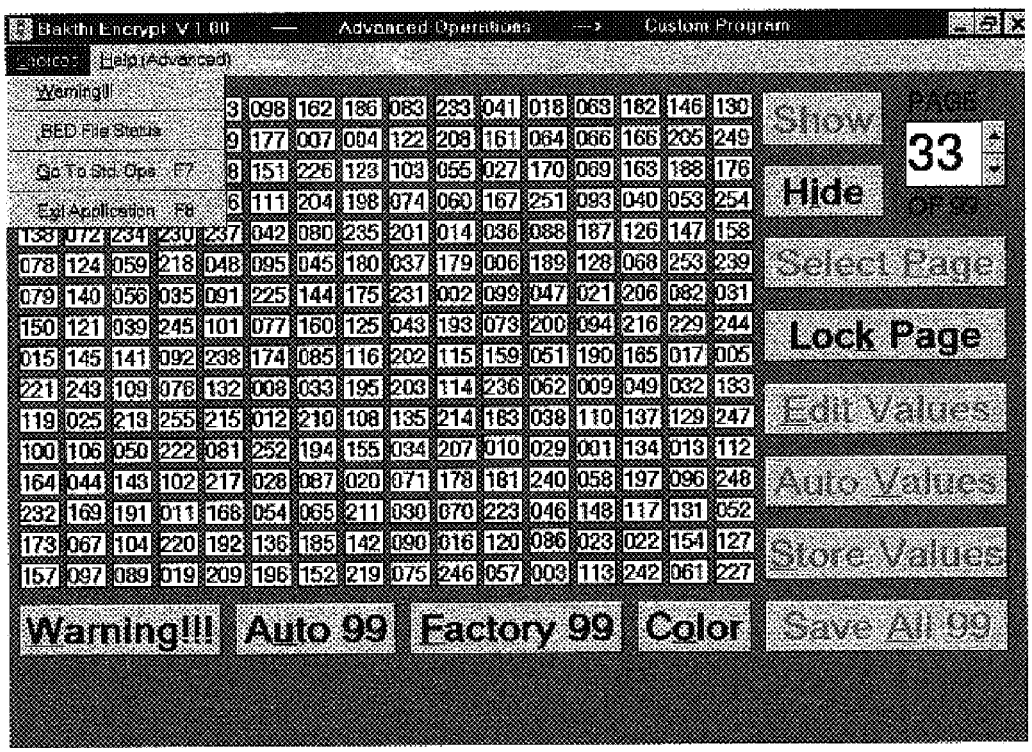
FIG. 6 (Page 5/5) is another view of the Advanced Operations Form of FIG. 3 In this drawing the Advanced Operations Form is showing a different "page", "page" 33 instead of "page" 99, of the Factory Default BED File in black and white format. The easy and safe editing of multiple "pages" is relevant to this Application for a Standard Patent because a method of safely editing the entire large data file known as a BED File must be provided. Claim (1) and Claim (3) involve editing. This illustration incidentally shows the Choices Menu of the Advanced Operations Form in an Opened state. The .BED File Status sub-menu is duplicated so that it may be viewed from both forms.

The best method of performing this invention known to me is its use in the new unpublished. Encryption/Decryption Computer Program which is described in Pages 1 to 24 and whose visual Graphic User Interface (GUI) is shown in the drawings on pages 1/5 to 5/5.

What is claimed is:

1. A novel method of making use of a large user-editable data file in an Encryption/Decryption Computer Program to enable the creation, by each user, of a uniquely customised version of the original Program, effectively allowing each user to create his or her own unique, private, secret Custom Encryption/Decryption Program which differs from the publicly distributed original Program and the Custom Encryption/Decryption Programs of all other users, such large user-editable data file being additional to, and distinct from, a normal encryption Key, and such large user-editable data file being used in such a manner that, within any given round of encryption manipulation, the difference between the ANSI codes of the input character at each particular position in the target file being manipulated and the output character at that particular position (such difference being referred to as the 'character "rotation"'), is very variable and dependant on not only the Key and the Particular Position in the target file, but also (and these are the important points) on the Input Character itself and the user-controlled Custom Contents of the large user-editable data file.

2. In the context of an Encryption/Decryption Computer Program, a novel method of creating a 'character "rotation"', very variable and dependant on the Key, the Particular Position in the target file, the Input Character, and the Contents of the Program's large data file, by using, for a particular round of encryption manipulation, a continuously changing unpredictable but reproducible number (ultimately derived from a Key) to select a particular electronic "page" of data from the Program's large data file, where it is essential that the number of "pages" be substantial, that each "page" of data contains a definite set of number values which is the same for all "pages", that the set of possible number values be of a substantial size, that there be no duplicate number values within each "page", and that each "page" have a different and reasonably random ordering of its number values, then for each particular position in the target input file using an integer, calculated from BOTH the ANSI value of the input character at that particular position and a pseudo-random number generated from a normal encryption Key, to act as a positional index into the selected "page", then using the value at that index as the output character.

3. In the context of a graphical user interface displaying "pages" of data from the large data file of an Encryption/Decryption Computer Program, a novel method of providing the means where by the Program's large data file may be safely edited by the user, especially the method of temporarily allowing duplicate values on a "page" of data at one stage but in the following stage identifying the duplicate values by colouring them a colour (for example yellow) that does not appear in a "page" which is completely correct and also adding to the form a long coloured bar within which are displayed in read-only form a list of the values missing from the set of number values, both actions facilitating the further editing of the page to make it completely correct, a completely correct page containing number values representing every member of the set with no duplicate values.

4. In the context of a graphical user interface displaying "pages" of data from the large data file of an Encryption/Decryption Computer Program, a novel method of dividing the set of possible number values forming each "page" of that large data file into sub-sets and displaying each sub-set in a different colour so that the state of randomness of the values in each "page" can be seen at a glance.

* * * * *